United States Patent Office 3,028,034
Patented Apr. 3, 1962

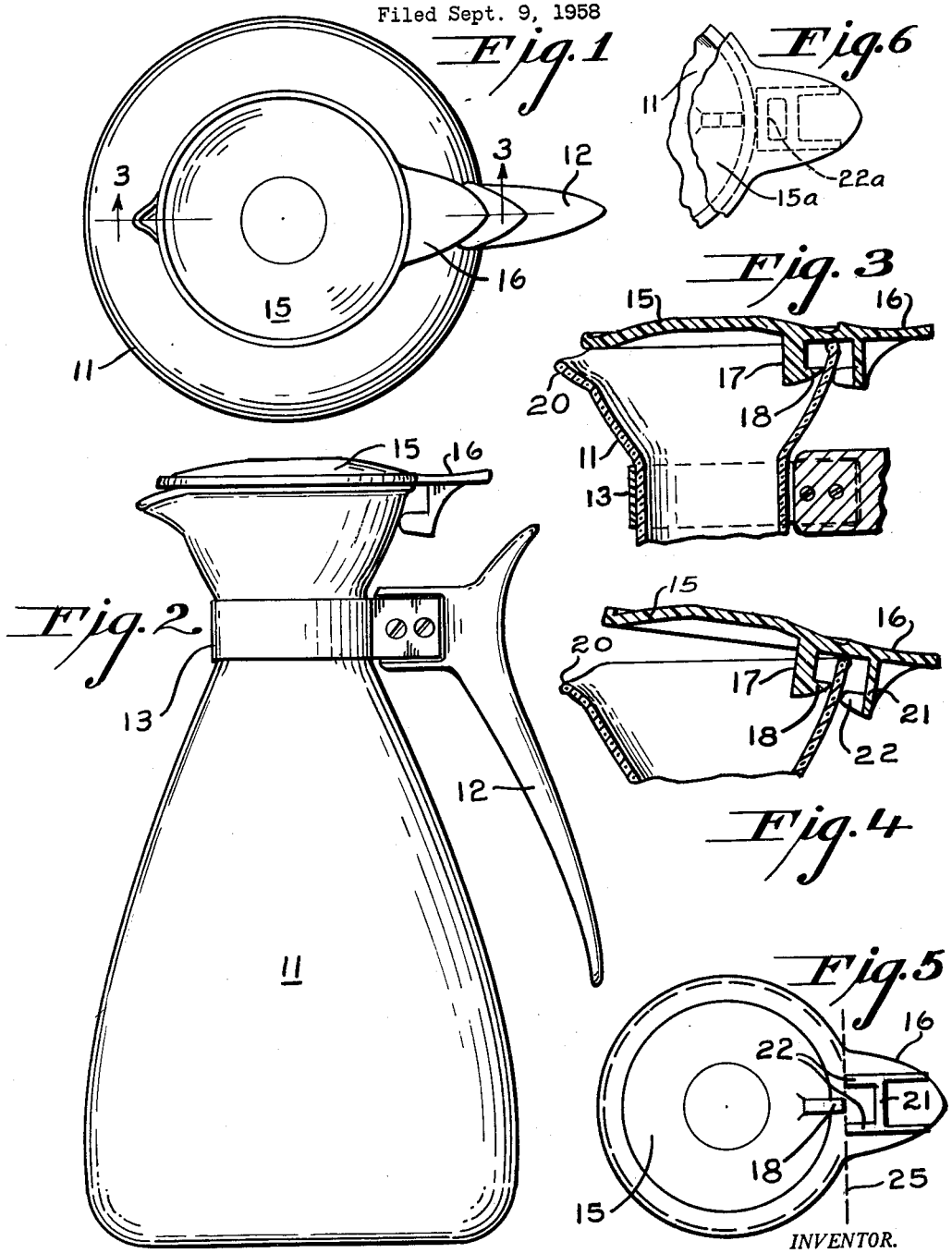

3,028,034
POURING VESSEL LID
David J. Freiman, Corning, N.Y., assignor to Corning Glass Works, Corning, N.Y., a corporation of New York
Filed Sept. 9, 1958, Ser. No. 760,001
4 Claims. (Cl. 215—63)

The present invention relates to tiltable lids for vessels, such as decanters or the like, although such form of lid may be applied to any of numerous forms of vessels.

The invention is concerned primarily with the provision of a simple readily removable lid that is manually tiltable to an open position, and is also tiltable by the contents of the vessel as it is tilted for a pouring operation.

According to the invention the lid comprises a unitary element of high strength resilient plastic or the like having an integrally formed handle, and wherein two integrally formed portions depending from the lid and from the handle respectively are provided; the portion depending from the handle having a pair of horizontally aligned bosses for engagement with the outer surface of the vessel wall slightly below its mouth; and the portion depending from the lid having a single boss for engagement with the generally oppositely disposed surface of such wall in a region intermediate to and slightly above the points of engagement of the pair of bosses with its outer surface. The space between a line drawn between the tips of such pair of bosses and the tip of the single boss is normally somewhat less than the vessel wall thickness, depending on the vessel wall thickness, and accordingly placement of the lid on the vessel requires forcing the one boss away from the pair. With the lid in place the pressure of the bosses on the outer surface of the vessel overcomes that placed on its inner surface by the single boss; thus resiliently, but lightly, holding the lid fulcrumed about the inner boss against the mouth bordering rim of the vessel. The lid may be readily removed from the vessel simply by exerting an upward pulling force on its handle and thus freeing the pair of bosses from frictional engagement with the vessel wall.

In a pouring operation the handle may be manually depressed and the pair of bosses employed as a fulcrum about which the lid is tilted to an open position. Alternatively, one can rely on engagement of the vessel contents with the underside of the lid to tilt it.

For a better understanding of the invention reference is made to the accompanying drawing in which:

FIG. 1 is a top plan view of a decanter assembly embodying the invention.

FIG. 2 is a side elevational view of the decanter assembly.

FIG. 3 is a sectional fragmentary view taken on line 3—3 of FIG. 1.

FIG. 4 is a view, similar to FIG. 3, but with the lid in a tilted position.

FIG. 5 is a bottom plan view of the lid only.

FIG. 6 is a plan view of a fragment of the decanter and of a lid having a single boss for engagement with the outer surface of the decanter.

Referring to the drawing in detail, the assembly comprises a decanter 11, a handle 12 held by a conventional form of band 13 and a lid. Such lid comprises a cover portion 15, and a laterally extending handle portion 16.

Depending from the underside of the cover portion 15, adjacent the inner end of the handle portion 16, is a portion 17 having a horizontally disposed pointed boss 18 in engagement with the inner surface of the decanter wall in a region opposite its pouring lip 20.

Depending from the handle portion 16 is a portion 21 having a pair of horizontally disposed bosses 22 engaging surfaces of the decanter wall opposite to and at a level somewhat below that engaged by boss 18. Alternatively a cover 15a may be provided which differs from cover 15 only in that it has a single boss 22a instead of two bosses 22. As will be evident from the showing in FIG. 5 the ends of bosses 18 and 22 normally terminate along a common plane, represented by an interrupted line 25. It is obvious therefore that placement of the cover on the decanter 11 requires flexing of the cover transversely of the handle in the handle-lid junction region in a manner to afford wedging of the vessel wall between the boss 18 and the pair of bosses 22. As previously stated the force exerted against the decanter wall by bosses 22 being greater than that exerted by boss 18 and at a level below the latter they resiliently hold the cover lightly against the mouth bordering portion of the decanter 11.

As will be understood the lid embodying the invention is applicable to a variety of forms of vessels by appropriate variation of the position of the anchoring bosses as determined by the shape and wall thickness of the vessel with which it is to employed.

What is claimed is:

1. A vessel lid, of resilient material, comprising mouth covering and handle portions respectively, said lid having integral therewith depending portions which may be laterally separated by flexing the lid to place a mouth bordering portion of a vessel wall between such depending portions as the lid is placed thereon, such depending portions engaging the opposite surfaces of the vessel walls at levels substantially below its mouth bordering portion and the depending portion located outside the vessel terminating at a level below the level of termination of the portion located within the vessel whereby pressures exerted by their maintained forceful separation by the article wall resiliently holds the lid against the mouth bordering portion of the vessel wall, said handle being depressible to flex such material and utilize the depending portion located outside the vessel as a fulcrum about which to tilt the lid.

2. A vessel lid such as defined by claim 1 wherein the depending portion exterior of the vessel has surface areas of engagement with the vessel wall on either side of the surface area engaged by the depending portion within the vessel.

3. A tiltable lid of resilient material suitable for use as the closure for a decanter or like vessel having vessel mouth covering and handle portions respectively, said lid having integral therewith depending portions for frictional engagement with oppositely disposed inner and outer surfaces of a wall region of a decanter surrounding its mouth when the lid is arranged thereover, the portion for engagement with the inner surface of such wall having a generally horizontally disposed boss for engagement therewith and the portion for engagement with the outer surface of such wall having a generally horizontally disposed boss for engagement with such outer surface, such latter boss being located at a level below the boss for engagement with the vessel inner surface and resiliently holding the cover fulcrumed about the boss on its inner surface against the mouth bordering portion of the vessel.

4. A tiltable lid of resilient material suitable for use as the closure for a decanter or like vessel having a vessel mouth covering portion and a handle portion respectively, said lid having depending portions integral therewith for frictional engagement with oppositely disposed inner and outer surfaces of a wall region of a vessel surrounding its mouth when the lid is arranged thereover, the depending portion interior of the vessel having a generally horizontally disposed boss for engagement with such inner surface of the vessel and the depending portion exterior of the vessel having a pair of generally horizontally disposed bosses for engagement with such outer surface of the vessel, the bosses of such pair being located at a level below and on either side of the boss for engagement with its inner surface and resiliently holding the cover fulcrumed about the boss on its inner surface against the mouth bordering portion of the vessel.

References Cited in the file of this patent

UNITED STATES PATENTS

| | | |
|---|---|---|
| 578,529 | Vogeley | Mar. 9, 1897 |
| 2,111,186 | Jenks | Mar. 15, 1938 |
| 2,664,221 | Seltzer | Dec. 29, 1953 |
| 2,733,829 | Lewit | Feb. 7, 1956 |
| 2,754,042 | Doeppel | July 10, 1956 |
| 2,785,823 | Zarges | Mar. 19, 1957 |

FOREIGN PATENTS

| | | |
|---|---|---|
| 14,696 | Great Britain | July 17, 1897 |
| 356,938 | France | Dec. 13, 1905 |